Patented July 5, 1927.

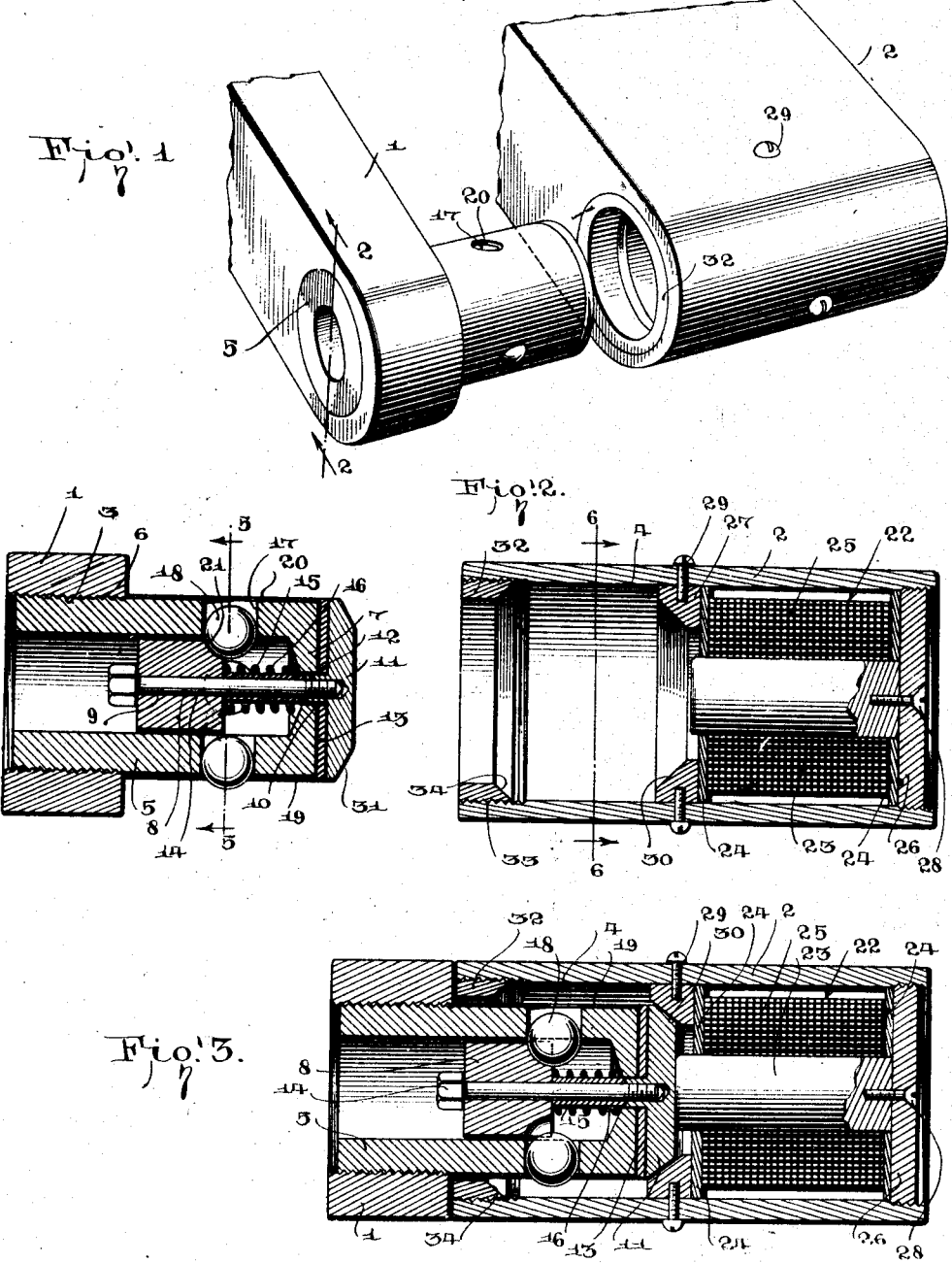

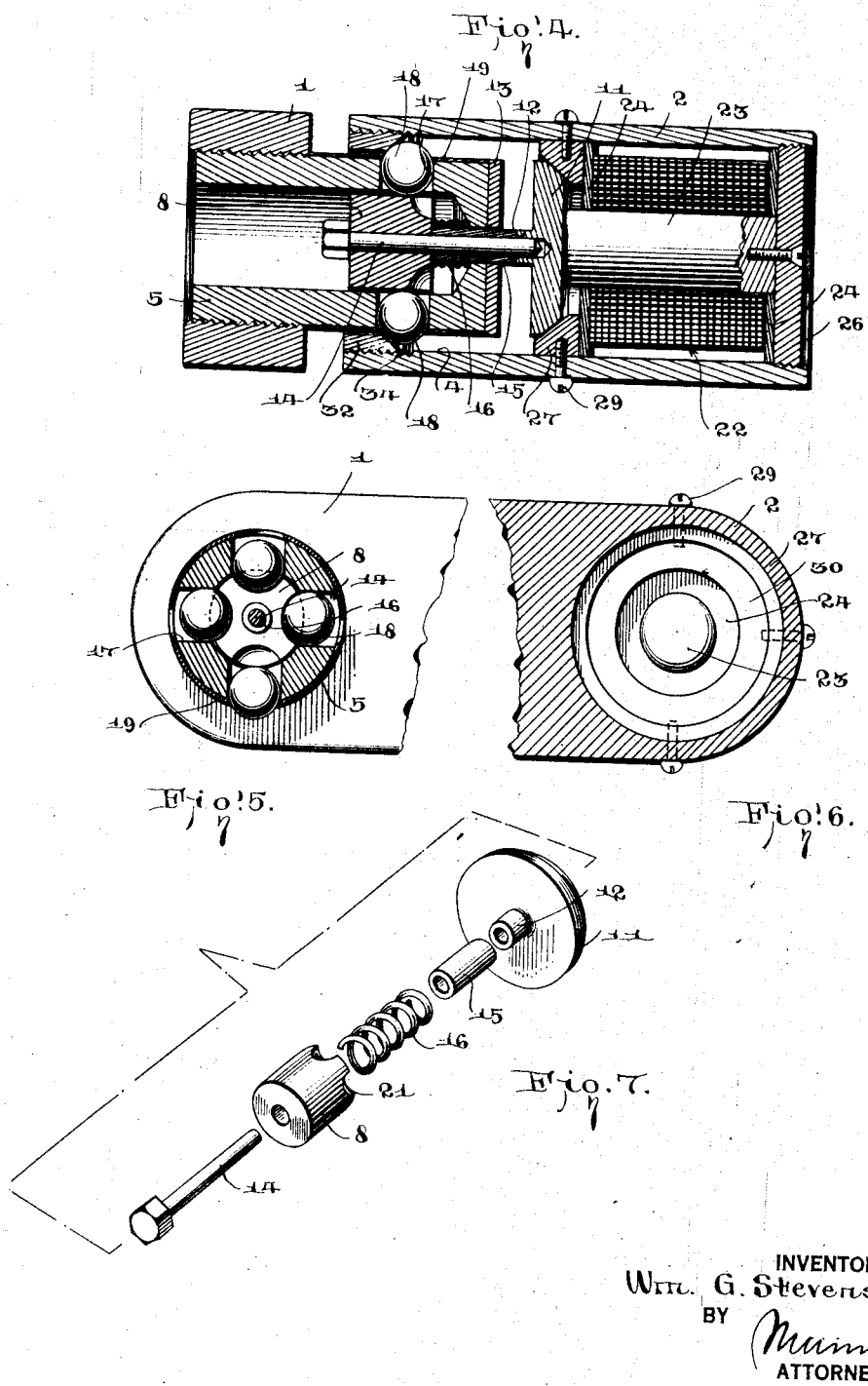

1,635,144

UNITED STATES PATENT OFFICE.

WILLIAM GRANT STEVENS, JR., OF NEW YORK, N. Y.

COUPLING.

Application filed December 18, 1926. Serial No. 155,737.

My invention relates generally to improvements in couplings, more particularly to a coupling of that type which includes mechanical coupling members dependent for their effective action on the holding power of an associated electro-magnet, and it consists in the combinations, constructions and arrangements herein described and claimed.

The invention is applicable to any two adjacent slidable blocks and is particularly well adapted for use as an automatic coupling for connecting two adjacent slidable blocks of a gear shifting mechanism, such as that which is disclosed in United States Patent #1,597,253, granted to me August 24, 1926.

An object of the invention is the provision of an automatic coupling of the character described having movable ball latch members associated with an armature so as to establish a mechanical connection between the parts that are to be coupled when and during energization of an associated electro-magnet and magnetic holding of the armature by the electro-magnet, the ball latch members being automatically movable to positions to be ineffective to effect a mechanical connection between the parts that are to be coupled when the electro-magnet is de-energized.

A further object of the invention is the provision of an automatic coupling of the character described which is entirely dependent for its effective action upon the holding power of a magnetically held armature in association with ball latch members for effecting a desirable coupling connection during the magnetic holding of the armature.

A further object of the invention is the provision of an automatic coupling of the character described which is reliable in use, not likely to get out of order easily, and thoroughly practical commercially.

Other objects and advantages of the invention will be apparent from the following description, considered in conjunction with the accompanying drawings, in which Figure 1 is a perspective view of two adjacent shiftable blocks having cooperative members of the improved coupling applied thereto, Figure 2 is a longitudinal vertical section through the blocks and the coupling members, substantially along the line 2—2 of Figure 1, showing the normal positions of the parts of the improved coupling when the associated blocks are in their spaced unconnected positions, Figure 3 is a sectional view similar to Figure 2 but showing the blocks moved together with the ball latch members of the coupling still in their inactive position, Figure 4 is a view similar to Figures 2 and 3, showing the blocks in their coupled together relation, the ball latch members being supported in their latching position, and the armature of the coupling being held magnetically in association with the energized electro-magnet, Figure 5 is a section substantially along the line 5—5 of Figure 2, Figure 6 is a section substantially along the line 6—6 of Figure 2, and Figure 7 is a perspective group view of the armature and certain associated elements of the coupling.

The invention utilizes the holding power of an iron-clad electro-magnet over an armature having a motion-transmitting connection with a plunger that is adapted to bias ball latch members from their inactive positions to their latching positions on a given limited movement apart of the members which are to be coupled together after such members have been moved together and the electro-magnet has been energized.

In the drawings, the numerals 1 and 2 respectively designate two adjacent shiftable blocks which are shown in Figure 1 in fragmentary form since the particular shape of the blocks is immaterial so far as the present invention is concerned. The blocks 1 and 2 respectively have alined bores 3 and 4, respectively, formed therein and preferably have their adjacent faces parallel with each other, as shown. It is to be understood that the term "block" as used herein covers any object or member of sufficient size to have a bore similar to either the bore 3 or the bore 4 formed therein.

The improved coupling includes a cylindrical carrying member 5 that is considerably longer than the bore 3 of the block 1. One end portion of the cylindrical member 5 is provided with external screw threads for engaging at 6 with screw threads on the wall of the bore 3 of the block 1 and the cylindrical member 5 is provided at its other end with an integral head 7 which preferably has a flat outer face. The screw threaded end portion of the cylindrical member 5 is screwed into the bore of the block 1 so that a substantial portion of the cylindrical member 5 protrudes from the bore 3 of the block 1 toward the block 2.

A plunger 8 is reciprocable in the carrying member 5. The plunger 8 has a central bore 9 in alinement with a slightly larger central opening 10 in the head 7. An armature disk 11 has a central tubular extension or hub 12 at its rear side on which is mounted an insulating disk or washer 13. The insulating disk 13 is disposed flatwise against the rear face of the armature disk 11 and the hub 12 is of sufficient length to extend slidably through the opening 10 in the head 7 when the armature disk is in its retracted position as shown to advantage in Figures 2 and 3 and the insulating disk 13 is in flatwise contact with the head 7. The armature disk 11 is connected with the plunger 8 by the shank of a bolt 14 which has its head disposed against the rear wall of the plunger 8 and extends through the bore of the plunger 8 into the hub 12, with which it is threadedly engaged. A spacing sleeve 15 is disposed on the shank of the bolt 14 between the plunger 8 and the adjacent end of the hub 12 and an expansion spring 16 is disposed on the sleeve 15 between the plunger 8 and the inner face of the head 7 and tends to hold the plunger in its retracted position as shown in Figures 1, 2 and 3.

The extending portion of the carrying member 5 is provided intermediate its length with a plurality of circumferentially spaced radial openings 17, preferably four in number, in which ball-shaped latch members 18 are partially disposed and are movable radially of the member 5. A retaining casing 19 of light gauge material is driven to place on the carrying member 5 until openings 20 in the member 19 are radially alined with the openings 17. The openings 20 have a diameter slightly less than the diameter of the balls 18 and, of course, also less than the diameter of the openings 17 so that the portions of the member 19 at the edges of the openings 20 extend inwardly beyond the outer edges of the openings 17 and constitute retaining lips or flanges for preventing complete outward displacement of the balls 18 from the openings 17. However, the openings 20 are of sufficinet diameter to permit considerable portions of the balls 18 to protrude therefrom outwardly of the periphery of the carrying member as shown to advantage in Figure 4. The balls 18 are prevented from moving inwardly of the carrying member 5 completely out of the openings 17 and are supported inwardly of the openings 20 by cam faces 21 on the outer end portion of the plunger 8 when the plunger is in its retracted position in the carrying member 5 as shown in Figures 2 and 3. The cam faces 21 may be the bottoms of concave notches or cut-away portions in the outer edge of the plunger 8, or simply an annular beveled surface or end.

It, of course, will be understood that the hereinbefore described parts which are either within the carrying member 5 or are otherwise associated therewith may be associated with the carrying member 5 before the latter is screwed to place in the bore of the block 1.

An electro-magnet generally indicated at 22 is disposed within the bore 4 of the block 2 and preferably comprises a soft iron core 23, fiber insulating disks 24 on the end portions of the core 23 and suitable magnet wire 25 which is wound on the core 23 between the fiber disks 24. The fiber disks 24 are adapted to fit in the bore 4 of the block 2 and the electro-magnet is confined in a portion of the bore 4 between a screw head 26 and a soft iron ring 27. The screw head 26 fits in the end portion of the bore 4 that is remote from the armature 11 and the insulating disk 24 at the adjacent end of the electro-magnet and the adjacent end of the core 23 are held against the head 26 by a screw 28 or like fastening means. The soft iron ring 27 is secured in place in the bore 4 against the other insulating disk 24 by the screws 29 or like fastening devices. The core 23 protrudes through the insulating disk 24 at the end of the electro-magnet that is turned toward the armature 11 substantially to the plane of the inner edge of the internally beveled outwardly enlarged end portion 30 of the inner wall of the soft iron ring 27. The armature 11 has an annular beveled portion 31 at its outer edge adapted to contact flatwise with the beveled portion 30 of the inner wall of the soft iron ring 27 when the central portion of the armature is in contact with the adjacent end of the core 23, as clearly shown in Figure 3.

An abutment ring 32 of case hardened steel or other suitable material is in threaded engagement at 33 with the wall of the bore 4 at the end of the latter which is nearest to the armature 11. The abutment ring 32 has its inner end wall beveled as indicated at 34 and has an inner diameter slightly greater than that of the retaining casing 19 on the carrying member 5.

From the foregoing description of the various parts of the device, the operation thereof may be readily understood. In actual practice, the blocks 1 and 2 will be slidable. It is intended that the block 1 shall reciprocate when desired because of its actuation in any suitable known manner, as by means of its connection with suitable mechanical means, not shown. In its reciprocation, the block 1 first is moved toward the block 2 until the armature 11 contacts with the soft iron ring 27 and with the core 23 of the electro-magnet and then the block 1 is moved backward or away from the block 2. The electro-magnet is of the iron-clad type since at least a portion of the block 2 which surrounds the electro-magnet is of soft or cast iron and the ring 27 also is of soft iron as hereinbefore stated. When the electro-magnet is energized, it will have a relatively strong attraction for the armature because of the relatively short distance between the poles of the electro-magnet and there will be a closed magnetic circuit when the electro-magnet is energized and the armature 11 is in contact with the core 23 and the soft iron ring 27. At that time, the flux passes from the core 23 uniformly in all radial directions so as to attract the armature 11 against the ring 27 and to allow the magnetic flux to flow through the iron of the block 2 back through the head 26 to the core. The function of the electro-magnet is merely to hold the armature 11 against the action of the spring 16. In consequence, when the block 1 has been moved toward the block 2 until the armature 11 contacts with the soft iron ring 27 and the core 23, the armature will be held by the magnetic force that is exerted by the electro-magnet if the electro-magnet is energized. Therefore, at the beginning of the backward stroke of the block 1, the armature 11 will be held stationary by the electro-magnet and the consequent movement of the plunger 8 in the carrying member 5 will bias the balls 18 outwardly in the openings 17 until such balls protrude as far as possible from the openings 20 beyond the outer wall of the carrying member and in positions to contact with the beveled inner end wall 34 of the abutment ring 32 when the block 1 has moved away from the block 2 from the position shown in Figure 3 to the position shown in Figure 4. It is manifest that further retractive movement of the block 1 will constrain the block 2 to follow the block 1. It is intended that the resultant movement of the block 2 shall effect a desirable result, as for example, the shifting of the gears of a motor vehicle. As soon as the electro-magnet is de-energized, the armature 11 will be released therefrom and will be moved to its retracted position, as shown in Figures 2 and 3 by the action of the spring 16 and the reciprocation of the block 1 then will not impart motion to the block 2 until the electro-magnet is again energized at the time the block 1 completes a forward stroke. It is to be noted that the block 2 will be pushed backward to normal position after it has been actuated by motion imparted thereto from the block 1 when the block 1 again moves forward and that the block 2 will remain in its normal position until the electro-magnet has been energized at the time the block 1 completes a forward stroke. Under all conditions of service, the effective action of the coupling is dependent upon the energization of the electro-magnet that is used with the coupling.

Obviously, the invention is susceptible of embodiment in forms other than that which is illustrated in the accompanying drawings and I therefore consider as my own all such modifications and adaptations thereof as fairly fall within the scope of the appended claims.

I claim:—

1. A coupling for two adjacent movable blocks, one of said blocks having a bore open at one end, a coupling member extending from the other block in position to enter said bore on movement of one of said blocks against the other block, an abutment within said bore, a latch member movably supported on said coupling member and normally disposed in position to clear said abutment when said blocks are moved together, and electro-magnetic controlled means for moving said latch member to position to engage said abutment on a definite retrograde movement of said coupling member in said bore during energization of the electro-magnet, whereby complete withdrawal of said coupling members from said bore will be prevented and the blocks will be coupled together.

2. A coupling for two adjacent movable blocks, one having a bore, comprising a carrying member extending from the other block and adapted to enter said bore on movement of the second block against the first block, an inwardly extending abutment ring adjacent to the outer end of the bore, ball shaped latch members movably associated with the carrying member and normally disposed in position to clear said abutment ring, an electro-magnet within said bore, an armature movably supported on said carrying member in position to be magnetically held by said electro-magnet when said carrying member has entered said bore said electro-magnet is energized, and and said electro-magnet is energized, and means operable on retrograde movement of said carrying member in said bore when said armature is magnetically held in the bore to move said latch members in position to engage with said abutment ring and then to prevent further retrograde movement of the carrying member.

3. A coupling for two adjacent movable blocks, one having a bore, comprising a carrying member extending from the other block and adapted to enter said bore on movement of the second block against the first block, an inwardly extending abutment ring adjacent to the outer end of the bore, ball shaped latch members movably associated with the carrying member and normally disposed in position to clear said abutment ring, an electro-magnet within said bore, an armature movably supported on said carrying member in position to be magnetically held by said electro-magnet when said carrying member has entered said bore and said electro-magnet is energized, means operable on retrograde movement of said carrying member in said bore when said armature is magnetically held in the bore to move said latch members to position to engage with said abutment ring and then to prevent further retrograde movement of the carrying member, and spring means acting to move said armature toward said carrying member on de-energization of said electro-magnet, whereby said latch members will be permitted to move to their normal inactive positions.

4. A coupling for two adjacent movable blocks, one having a bore, comprising a carrying member extending from the other block and adapted to enter said bore on movement of the second block against the first block, an inwardly extending abutment ring adjacent to the outer end of the bore, ball shaped latch members movably associated with the carrying member and normally disposed in position to clear said abutment ring, an electro-magnet within said bore, an armature movably supported on said carrying member in position to be magnetically held by said electro-magnet when said carrying member has entered said bore and said electro-magnet is energized, and means operable on retrograde movement of said carrying member in said bore when said armature is magnetically held in the bore to move said latch members to position to engage with said abutment ring and then to prevent further retrograde movement of the carrying member, said electro-magnet having an iron-clad mounting including a ring of magnetically conducting material within said bore in position to contact with said armature when the armature is held magnetically by said electro-magnet.

5. A coupling for two adjacent slidable blocks having alined bores, comprising a tubular carrying member having an end portion engageable with the wall of the bore of one of said blocks and having a head at its other end, the extending portion of said tubular carrying member being adapted to enter the bore of the second block when the first block is moved against the second block, said head of the tubular carrying member having a central opening, an armature disk at the outer end of the carrying member having a central tubular extension at its inner side slidable in the central opening of said head, an insulating disk on said tubular extension between said armature and the head of the tubular carrying member, said tubular carrying member having a radial opening at a substantial distance from said head, a plunger reciprocable in said tubular carrying member, said plunger having a bore, a bolt having its shank extending slidably through the bore of the plunger and engaged with the tubular extension of said armature, a spacing sleeve on said bolt between said plunger and the tubular extension of said armature, an expansion spring on said sleeve between the head of the carrying member of said plunger, whereby said armature normally is held close to the head of the carrying member and said plunger normally is disposed at the side of said radial opening opposite to said head, said plunger having a cam or beveled surface partially underlying said radial opening, a ball latch member supported in said radial opening by the cam or beveled surface of said plunger inwardly of the outer periphery of the carrying member, means on the outer periphery of said carrying member for preventing said ball member from moving outward completely out of said radial opening, an electro-magnet within the bore of the second block at a substantial distance from the end of said last named bore that is adjacent to said first block, an abutment ring in the bore of said second block, said abutment ring being adapted to permit entering of said carrying member into the bore of the second block when said ball member is in its inwardly retracted inactive position and to be engaged by said ball member to prevent complete displacement of said carrying member from the bore of the second block when said ball member is in position to protrude radially outward from said carrying member, said electro-magnet being adapted to hold said armature magnetically when the electro-magnet is energized and said carrying member has been moved into the bore of the second block and said plunger being adapted to bias said ball member radially outward to latching position on retrograde movement of the carrying member in the bore of the second block when said armature is magnetically held in the second block.

6. A coupling for two adjacent slidable blocks having alined bores, comprising a tubular carrying member having an end portion engageable with the wall of the bore of one of said blocks and having a head at its other end, the extending portion of said tubular carrying member being adapted to enter the bore of the second block when the first block is moved against the second block, said head of the tubular carrying member having a central opening, an armature disk at the outer end of the carrying member having a central tubular extension at its outer side slidable in the central opening of said head, an insulating disk on said tubular extension between said armature and the head of the tubular carrying member, said tubular carrying member having a radial opening at a substantial distance from said head, a plunger reciprocable in said tubular carrying member, said plunger having a bore, a bolt having its shank extending slidably through the bore of the plunger and engaged with the tubular extension of said armature, a spacing sleeve on said bolt between said plunger and the tubular extension of said armature, an expansion spring on said sleeve between the head of the carrying member of said plunger, whereby said armature normally is held close to the head of the carrying member and said plunger normally is disposed at the side of said radial opening opposite to said head, said plunger having a cam or beveled surface partially underlying said radial opening, a ball latch member supported in said radial opening by the cam or beveled surface of said plunger inwardly of the outer periphery of the carrying member, means on the outer periphery of said carrying member for preventing said ball member from moving outward completely out of said radial opening, an electro-magnet within the bore of the second block at a substantial distance from the end of said last named bore that is adjacent to said first block, an abutment ring in the bore of said second block, said abutment ring being adapted to permit entering of said carrying member into the bore of the second block when said ball member is in its inwardly retracted inactive position and to be engaged by said ball member to prevent complete displacement of said carrying member from the bore of the second block when said ball member is in position to protrude radially outward from said carrying member, said electro-magnet being adapted to hold said armature magnetically when the electro-magnet is energized and said carrying member has been moved into the bore of the second block and said plunger being adapted to bias said ball member radially outward to latching position on retrograde movement of the carrying member in the bore of the second block when said armature is magnetically held in the second block, a ring of magnetical conducting material at the outer end of said electro-magnet said last named ring having a beveled inner edge and said armature having a beveled outer edge adapted to contact flatwise with the beveled portion of said last named ring when said armature is in position to be attracted by said electro-magnet.

7. A coupling of the character described comprising two relatively movable adjacent blocks respectively having coupling members adapted to be disposed in positions to effect coupling of said blocks when said blocks are moved together, an electro-magnet on one of said blocks, an armature having limited independent movement on the other of said blocks, said armature being adapted to be moved into the effective magnetic field of the electro-magnet when said blocks are moved together, the coupling means on the armature-carrying block normally being ineffective to cooperate with the coupling means on the other block to couple said blocks together, and means operable when said armature is held by said electro-magnet after the blocks have been moved together on a definite separating movement of the blocks to render the coupling means of the armature-carrying block effective to engage with the coupling means of the other block to complete a motion transmitting connection between said blocks.

8. A coupling of the character described comprising two relatively movable adjacent blocks respectively having coupling members adapted to be disposed in positions to effect coupling of said blocks when said blocks are moved together, an electro-magnet on one of said blocks, an armature having limited independent movement on the other of said blocks, said armature being adapted to be moved into the effective magnetic field of the electro-magnet when said blocks are moved together, the coupling means on the armature-carrying block normally being ineffective to cooperate with the coupling means on the other block to couple said blocks together, and means operable when said armature is held by said electro-magnet after the blocks have been moved together on a definite separating movement of the blocks to render the coupling means of the armature-carrying block effective to engage with the coupling means of the other block to complete a motion transmitting connection between said blocks, the coupling means of the armature-carrying blocks including radially movable ball latch members normally in positions to clear the coupling means of the other block, and means operable by the armature when the armature is magnetically held by the electro-magnet and the armature carrying block is moved away from the other block to bias said ball latch members radially outward to positions to engage with the coupling means of the other block.

WILLIAM GRANT STEVENS, Jr.